Figures 1, 2, 3, 4:
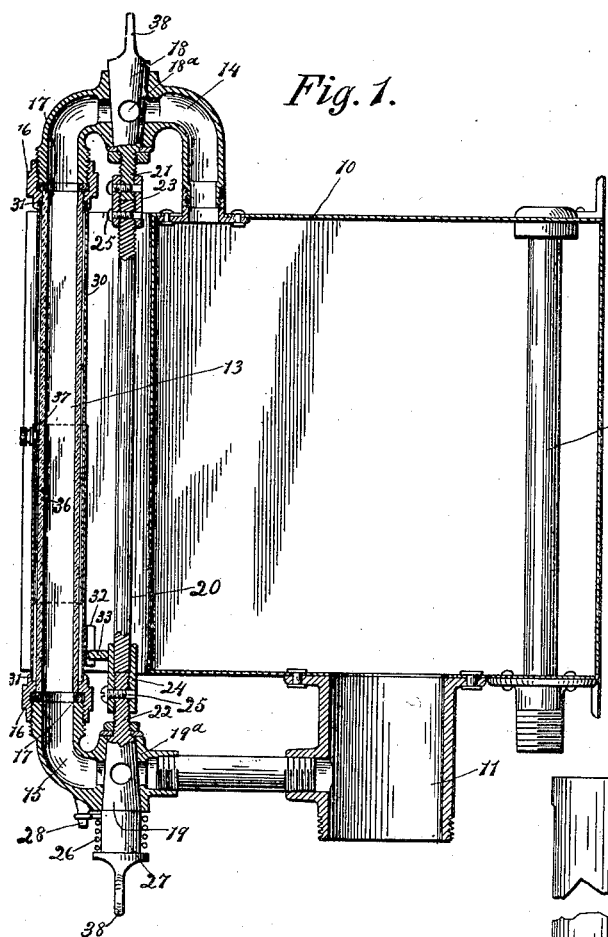

No. 705,113. Patented July 22, 1902.
J. A. MOSHER.
SAFETY DEVICE FOR WATER GAGES.
(Application filed Oct. 25, 1901.)
(No Model.)

WITNESSES:
W. H. Cotton
Arthur B. Seibold

INVENTOR.
John A. Mosher.
BY
ATTORNEY.

UNITED STATES PATENT OFFICE.

JOHN A. MOSHER, OF CHICAGO, ILLINOIS, ASSIGNOR TO THE ADAMS & WESTLAKE COMPANY, A CORPORATION OF ILLINOIS.

SAFETY DEVICE FOR WATER-GAGES.

SPECIFICATION forming part of Letters Patent No. 705,113, dated July 22, 1902.

Application filed October 25, 1901. Serial No. 79,957. (No model.)

*To all whom it may concern:*

Be it known that I, JOHN A. MOSHER, a citizen of the United States, and a resident of Chicago, county of Cook, and State of Illinois, have invented certain new and useful Improvements in Safety Devices for Water-Gages, of which the following is a specification and which are illustrated in the accompanying drawings, forming a part thereof.

The object of the invention is to automatically disconnect the gage-glass from the tank, so that in the event of breakage of the glass there will be no escape of pressure; and a further object is to automatically render the gage non-indicating when cut off from the tank, so that the observer will not be misled, as he will be compelled to open the connection with the tank in order to get any reading whatever.

The invention is particularly adapted for use in connection with acetylene-gas generators to prevent escape of gas should the gage-glass be broken, but may of course be used in any situation where the liquid may be under pressure.

The invention comprises a tank, a gage-glass, connection between the tank and the glass, a valve in the said connection, a shield in front of the gage-glass, means for moving the shield to expose the glass when the valve in the connection is opened, and means for closing the valve and moving the shield in front of the gage-glass.

The invention consists of the arrangement and combination of parts hereinafter described and which are illustrated in the accompanying drawings, in which—

Figure 1 is a vertical section of a tank with glass gage for indicating the height of water in the tank and showing my invention applied thereto. Fig. 2 is a front elevation of the gage and the shield, and Figs. 3 and 4 relate to details.

In the drawings I have shown at 10 a water-tank used with an acetylene-gas generator, at 11 the outlet-pipe leading therefrom to the generating-tank, and at 12 an overflow-pipe extending from the generating-tank to the top of the water-tank. The inlet-pipe of the tank is not shown. The gage glass or tube 13 communicates with the tank 10 through a connection 14, leading from its upper end through the top of the tank, and a connection 15, leading to the bottom of the tank or into the pipe 11, as shown in the drawings, the said connections being coupled with the gage-tube by nuts 16, which are provided with water-tight packing 17.

Located in the connections 14 15 are valves 18 19, having the ports $18^a$ and which are coupled so as to move simultaneously. The type illustrated being rotary oscillating valves, such coupling may consist of the rod 20, the ends of which are connected with the inwardly-extending stems 21 22 of the valves by threaded sleeves 23 24. The stems 21 22 are provided with apertures for the reception of screws 25, passing through the said sleeves in order to insure the alinement of the valves and the consequent simultaneous opening of the passage in the connections 14 15. The valves are held normally closed by a spring 26, which may be coiled about an extension 27 of one of the valves, as 19, and have one of its ends anchored thereto and the other, as at 28, to the connection 15.

Inclosing the gage-tube 13 and having a sight opening or aperture 29 is a tubular shield 30, the ends of which fit loosely in the flanged ends 31 of the nuts 16, and the said shield is provided with a gear 32, which meshes with and is turned by a gear 33 on the sleeve 24 at the lower end of the rod 20.

As shown in the drawings, the valves are designed to make one-fourth revolution in opening or closing, being limited to such movement by a pin 34 on the extension of the valve 19 and playing in a recess 35 in the valve-plug $19^a$ of the valve 19, and the sight-opening 29 in the shield is so positioned with relation to the gear 32 that when the valve is opened to the limit of its movement the gage-tube will be exposed through the opening.

For convenience in inserting and removing the shield 30 it is preferably made in two telescoping sections, one of which is provided with a slot 36 to receive a set-screw 37, carried by the other section, insuring the proper alinement of the two sections for the sight-opening 29.

Either or both of the valves are provided with finger-pieces 38 for turning the valves.

Whenever it is desired to ascertain the quantity of water in the tank, the shield is moved away from in front of the gage-tube, this being done by turning one of the valves 18 19, which through the connecting-rod opens the other valve and also through the medium of the gearing rotates the shield. The water in the gage-tube immediately seeks the level of the water in the tank and of course remains at the level then reached after the valves close under the influence of the spring 26, when the finger-piece held is released until the valves are again opened. These automtically-closing valves prevent the escape of gas should there be any in the tank and should the gage-glass be broken, while the presence of the shield prevents a false reading of the gage, as the valves are necessarily opened at each reading, thus allowing the water to instantly assume the level of that within the tank.

While a pair of valves is shown and connection between the shield and valves is by means of gears, it is obvious that any form of sight-shield coupled in any manner with the automatically-closing valve or valves, so that the gage is normally cut off from the tank and is exposed to view only when connected therewith, would come within the scope of the invention.

I claim as my invention—

1. In combination, a tank, a transparent gage-tube, means for obscuring the gage-tube and means for cutting it off from the tank, and means for simultaneously exposing the gage-tube to view and for opening its connection with the tank.

2. In a safety device for water-gages, in combination, a tank or other receptacle, a gage-glass, connection between the tank and the glass, a valve in the connection, an obscuring-shield in front of the glass, and means for moving the shield away from in front of the glass when the valve is opened.

3. In a safety device for water-gages, in combination, a tank or other receptacle, a gage-glass, connection between the tank and the glass, a valve in the connection, a shield in front of the gage-glass, connection between the valve and the shield, and means for holding the valve normally closed and the shield in front of the gage-glass.

4. In a safety device for water-gages, in combination, a tank or other receptacle, a gage-glass, connections between the gage-glass and the tank, a valve in each of said connections, means for moving the valves simultaneously, an obscuring-shield normally in front of the gage-glass, and means for moving the shield when the valves are opened.

5. In a safety device for water-gages, in combination, a tank or other receptacle, a gage-glass, connection between the upper and lower ends of the tank and the gage-glass, a valve in each of said connections, means for moving the valves simultaneously, a spring holding the valves normally closed, a shield in front of the gage-glass, and a connection between the valves and the shield.

6. In a safety device for water-gages, in combination, a tank or other receptacle, a gage-tube, connections between the upper and lower ends of the tank and the tube, a valve in each of said connections, a rod connecting the two valves, a spring holding the valves normally closed, an apertured tubular shield inclosing the gage-tube and comprising a pair of telescoping sections, and a gear connection between the rod and the shield.

7. In a safety device for water-gages, in combination, a tank or other receptacle, a gage-glass, connections between the upper and lower ends of the gage-glass and the tank, a valve in each of said connections, connection between the valves, and a spring for holding the valves normally closed.

8. In combination, a tank and a transparent gage-tube therefor, a shield, a valve for closing communication between the tank and the gage-tube, means for holding the shield so as to obscure the gage-tube and for holding the valve closed, and means for simultaneously moving the shield to bring the gage-tube into view and for opening the valve.

9. The combination with a transparent water-gage, of an obscuring-shield removably covering the gage, a valve for closing the gage, and operative connection between the valve and the shield.

JOHN A. MOSHER.

Witnesses:
WM. S. HAMM,
LOUIS V. EGGERT.